(12) United States Patent
Archambeau et al.

(10) Patent No.: US 7,839,576 B2
(45) Date of Patent: Nov. 23, 2010

(54) PRODUCING A TRANSPARENT OPTICAL ELEMENT COMPRISING A SUBSTANCE CONTAINED IN CELLS

(75) Inventors: Samuel Archambeau, Charenton le Pont (FR); Jérôme Ballet, Charenton le Pont (FR); Jean-Paul Cano, Charenton le Pont (FR); Paul Lefillastre, Charenton le Pont (FR); Laëtitia Pont, Charenton le Pont (FR); Anthony Saugey, Charenton le Pont (FR); Feng Shi, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 218 days.

(21) Appl. No.: 12/301,055

(22) PCT Filed: May 11, 2007

(86) PCT No.: PCT/FR2007/051254
§ 371 (c)(1),
(2), (4) Date: Nov. 17, 2008

(87) PCT Pub. No.: WO2007/132116
PCT Pub. Date: Nov. 22, 2007

(65) Prior Publication Data
US 2009/0262436 A1      Oct. 22, 2009

(30) Foreign Application Priority Data
May 17, 2006    (FR) .................................. 06 04421

(51) Int. Cl.
G02B 1/06      (2006.01)
(52) U.S. Cl. ..................................... 359/665

(58) Field of Classification Search .................. 359/665, 359/253, 272, 226.3, 228, 832; 349/84, 86, 349/92; 65/37, 39, 378, 385
See application file for complete search history.

(56) References Cited

U.S. PATENT DOCUMENTS

| | | |
|---|---|---|
| 4,150,878 A | 4/1979 | Barzilai et al. |
| 5,067,795 A | 11/1991 | Senatore |
| 5,139,707 A | 8/1992 | Guglielmetti et al. |
| 5,233,038 A | 8/1993 | Guglielmetti et al. |
| 5,359,444 A | 10/1994 | Piosenka et al. |
| 5,529,725 A | 6/1996 | Guglielmetti et al. |

(Continued)

FOREIGN PATENT DOCUMENTS

AU        779628        2/2005

(Continued)

Primary Examiner—Joseph Martinez
(74) Attorney, Agent, or Firm—Occhiuti Rohlicek & Tsao LLP

(57) ABSTRACT

The invention concerns a method for producing a transparent optical element (1) including filling cells (10) of the element with a substance having an optical property. It consists in moving an amount of the substance (20) radially on the cells, towards a peripheral edge of the optical element, such that the substance penetrates each cell. Optionally, the cells may be sealed with a film (30) fixed on the partition walls (11) of the cells. The filling and the sealing of the cells may be carried out in a single step of the process.

19 Claims, 1 Drawing Sheet

U.S. PATENT DOCUMENTS

| | | |
|---|---|---|
| 5,604,280 A | 2/1997 | Pozzo et al. |
| 5,807,906 A | 9/1998 | Bonvallot et al. |
| 6,019,914 A | 2/2000 | Lokshin et al. |
| 6,281,366 B1 | 8/2001 | Frigoli et al. |
| 6,327,072 B1 | 12/2001 | Comiskey et al. |
| 6,597,340 B1 | 7/2003 | Kawai |
| 2002/0140899 A1 | 10/2002 | Blum et al. |
| 2002/0176963 A1 | 11/2002 | Chen et al. |
| 2004/0008319 A1 | 1/2004 | Lai et al. |
| 2006/0006336 A1* | 1/2006 | Cano et al. ........... 250/345 |

FOREIGN PATENT DOCUMENTS

| | | |
|---|---|---|
| CA | 2340672 | 12/2000 |
| DE | 19714434 | 10/1998 |
| FR | 2718447 | 10/1995 |
| JP | 02 223936 | 9/1990 |
| WO | 02/01281 | 1/2002 |
| WO | 03/012542 | 2/2003 |
| WO | 03/077012 | 9/2003 |

* cited by examiner

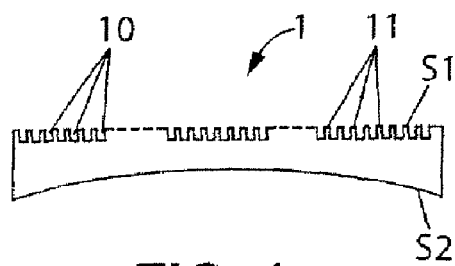
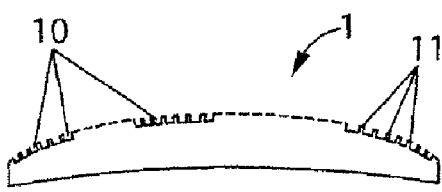
FIG. 1a    FIG. 1b
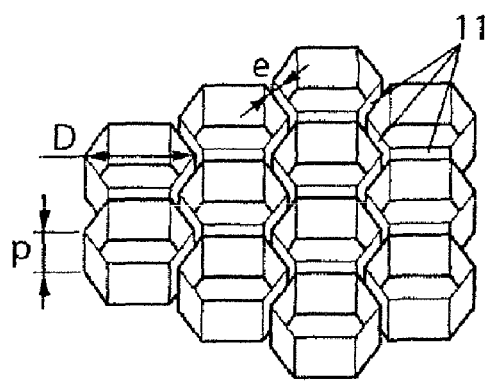
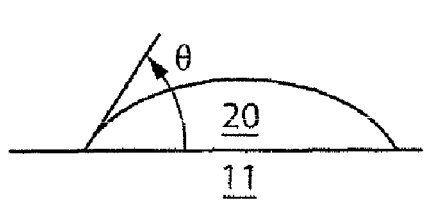
FIG. 2    FIG. 3
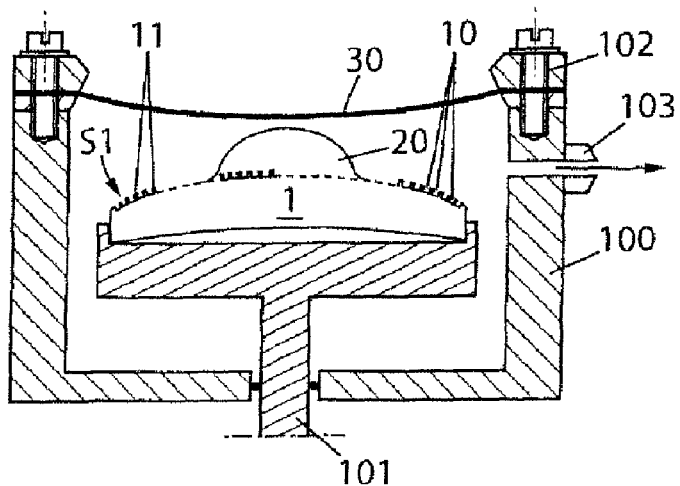
FIG. 4a
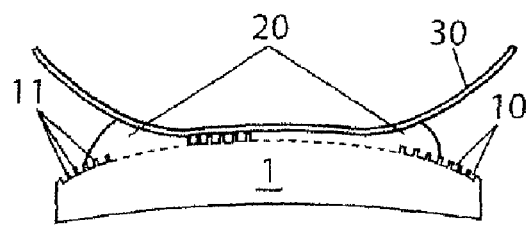
FIG. 4b

PRODUCING A TRANSPARENT OPTICAL ELEMENT COMPRISING A SUBSTANCE CONTAINED IN CELLS

CROSS-REFERENCE TO RELATED APPLICATIONS

This application is the National Stage of International Application No. PCT/FR2007/051254, filed on May 11, 2007, which claims the priority of French Application No. 0604421, filed on May 17, 2006. The contents of both applications are hereby incorporated by reference in their entirety.

The present invention relates to a method of producing a transparent optical element which comprises a substance contained in cells. It also relates to an optical element which is thus obtained.

It is known to give an optical property to an element by producing a set of cells on the surface of that element and by inserting an appropriate optical substance into the cells, in the form of a liquid. The surface then gives the desired optical property to the element. The element may be an optical lens, in particular an ophthalmic lens. By way of example, the substance may have a variable refractive index, for example in order to adjust an optical power and/or an astigmatism of a lens. It may also be a colorant, a photochromic substance, an electrochromic substance, etc.

A particular difficulty appears when the optical element is transparent. Indeed, for a transparent optical element, possible defects substantially affect the optical quality of the element, even when these defects are of micronic size. In particular, certain defects may generate light phenomena such as a diffraction, and appear in the form of iridescences, variations in the transmission of light through the optical element, scintillations, etc.

In the context of the invention it is understood that an optical element is transparent when an object which is observed through that element is perceived without significant loss of contrast. In other words, an image can be formed through the optical element with sufficient quality, notably in terms of contrast and sharpness. Thus, diffraction and diffusion, which correspond to the scattering of light when the latter is materially restricted at a place in its path ("Optique— Fondement et applications"—J. P. Dunrod—7$^{th}$ edition— Paris 2004—Page 262), are considered as lacks of transparency.

For a transparent optical element which comprises a substance contained in cells, it is therefore essential that all of the cells are filled with the substance in the same way in order to avoid the formation of optical defects which may degrade the transparency of the element, but also its dioptric and cosmetic quality level. In particular, the absence of bubbles in certain cells, the absence of variations in the filling level between different cells and the absence of damage to the walls of certain cells are essential.

One object of the invention is to produce a transparent optical element which is provided with cells for containing an optical substance and which has sufficient optical quality, compatible with the transparency of the element.

Another object of the invention is to produce a transparent optical element which is provided with cells on a possibly curved face.

To this end, the invention proposes a method of producing a transparent optical element, which comprises the following steps:

a) producing an optical component having at least one set of empty cells which are juxtaposed, parallel with a surface of the component, the cells being open at the level of the surface of the component and separated by walls;

b) depositing a quantity of a liquid substance having an optical property over a part of the set of cells, this quantity corresponding to a volume greater than the total capacity of the cells; and c) pushing a portion of the substance which is situated outside of the cells over the walls and the cells, so that the substance penetrates into the cells not yet filled and so as to expel an excess of substance, by sweeping the whole set of cells.

Thus, according to the invention, the liquid substance having an optical property is pushed over the whole surface of the optical component provided with cells so that it penetrates into the cells according to a filling front which is moved progressively. In this way, the air initially present in the cells can escape freely ahead of the filling front. No bubbles are therefore formed in the cells.

Moreover, given that a pressure applied to the optical component is necessary only for pushing the portion of the substance which is outside of the cells, such a pressure can be limited. Indeed, the movement of the substance over the set of cells can be obtained by applying a force which is directed parallel with the surface of the optical component. The risk of deforming the optical component and that of damaging certain of the walls of the cells is therefore reduced.

Finally, given that a quantity of substance is brought above each cell, during its filling, which is greater than the capacity of that cell, all of the cells are filled in the same way with respect to their upper opening, whatever the depth or size of each cell may be.

When the set of cells has been entirely swept by pushing the part of the substance present above the cells, a portion of the substance which still remains outside of the cells constitutes an unused surplus of substance. This surplus can be retrieved in order to be used for producing another optical element, or can be minimized by adjusting the quantity of substance initially deposited on the set of cells.

According to an additional feature of the invention, the portion of substance which is situated outside of the cells is pushed radially from a central zone of the set of cells towards a peripheral edge of that set, according to a substantially circular moving front.

According to a particular embodiment of the invention, a deformable membrane may be used for pushing the substance over the set of cells. For example, the membrane may be retained by a peripheral edge of the latter and may be brought over the set of cells. It is then deformed in order to become applied against the optical component. It may be deformed by suction, in particular by creating a reduced pressure between the component and the membrane.

Advantageously the substance having an optical property is adapted such that an angle of contact between that substance and the optical component is less than 90° at the location of the cells. For this purpose, a surface-active agent may optionally be added to the substance having an optical property in order to adjust a surface tension of the latter. In this way, the substance having an optical property which is contained in each cell may have a substantially flat surface in the opening of the cell, without forming a convex or concave meniscus. No reduction of the transparency of the optical element, for example due to light diffusion, therefore results from the shape of the surface of the substance in the opening of each cell. Moreover, the filling of the cells can be carried out in these conditions exactly up to the top of the walls, in a controlled and reproducible manner.

According to an improvement of the invention, the method may furthermore comprise a sealing of the cells filled with substance using a substantially transparent film which is applied over the set of cells, and which may be fixed to the walls of the cells. Advantageously, the film is fixed to these walls in a permanent manner, so that the optical substance can no longer leak from the cells, either during the continuation of the manufacture of the optical element or during the use of the latter.

Preferably, the sealing of the filled cells is carried out by applying the film progressively over the set of cells during step c). The film then pushes the part of the substance which is outside of the cells during its application. The filling of the cells with the substance and the sealing of the cells are thus combined in a single step. The manufacturing time of the optical element is thus reduced and, consequently, the cost price of each optical element unit which is manufactured is reduced.

The invention also proposes a transparent optical element produced by using a method such as described above. Such an element may be an optical lens and, in particular, an ophthalmic lens.

Other features and advantages of the present invention will appear in the following description of non-limiting examples of embodiment, provided with reference to the appended drawings, in which:

FIGS. 1a and 1b show two optical components to which the invention can be applied;

FIG. 2 is an enlarged view of the cells;

FIG. 3 shows a convention for measuring an angle of contact; and

FIGS. 4a and 4b show a particular method of filling cells, according to the invention.

For sake of clarity, the dimensions of the elements shown are not in proportion with actual dimensions or ratios of dimensions. Moreover, identical references in different figures refer to identical elements.

The optical components 1 which are shown in FIGS. 1a and 1b are blanks of ophthalmic lenses, or spectacle lenses. Such lenses can be made of a mineral or organic material. It is understood that the ways of implementing the invention which are described hereafter can be adapted, in a way that is known per se, according to the material of the lens.

Each lens 1 has two faces S1 and S2, whose shapes define the optical power and the astigmatism of the lens. Optionally, one of the two faces may be flat (FIG. 1a), or both faces may be curved (FIG. 1b). In order to implement the invention, one of the two faces of the lens 1, for example the face S1, is provided with a set of juxtaposed cells 10, which form cavities intended to be filled with a liquid substance. For the component 1 shown in FIG. 1a, the face S1 provided with the cells 10 is flat. It is curved for the component 1 of FIG. 1b.

According to FIG. 2, two adjacent cells 10 are separated by a wall 11. The set of cells 10 may be formed directly in the component 1 or, alternatively, it may be formed in a film which is added, for example by adhesion, to the component 1. The cells 10 may be disposed in a regular or irregular manner beside each other. In particular, they may form a hexagonal pattern. By way of example, each cell 10 may have a transverse dimension D of about 200 μm (micrometer), parallel with the surface of the component 1, and a depth p of about 5 μm, perpendicular to the surface of the component. The walls 11 may have a thickness e of about 2 μm, parallel with the surface of the component 1.

The liquid substance which is intended to be introduced into the cells 10 may have a particular refractive index or a refractive index which may be modified subsequently, notably by irradiation. It may also be a colorant substance, a photochromic substance, an electrochromic substance, a substance based on liquid crystals, etc. It preferably has a low viscosity and a sufficient wetting capability on the material of the walls 11. The viscosity and the surface tension of the substance having an optical property may be adjusted, in a way known to those skilled in the art, by adding to it at least a fluidifying agent and a surface-active agent. For example the viscosity of the substance may thus be adjusted to a value of less than 10000 centipoises, and the angle of contact of the substance with the surface of the walls 11 may be adjusted to a value of less than 90°. FIG. 3 illustrates the convention used for measuring the angle of contact θ of a drop of the substance on a flat surface of the material of the walls 11.

Optionally, the substance having an optical property may incorporate solid particles, having dimensions sufficiently small to not interfere with the filling of the cells. It may also be a gel, if the viscosity of the latter makes it possible to fill the cells. Such a gel is then likened to a liquid in the context of the invention.

A specified quantity of the substance 20 is deposited on the surface S1 of the optical component 1. Preferably, the component 1 is held in a substantially horizontal position, with the face S1 facing upwards. The quantity of substance is advantageously determined in order to allow a filling of all of the cells 10 in a single step. In this way no marks appear between zones of the set of cells 10 which correspond to separate filling steps. For example, the quantity of substance 20 which is deposited on the component 1 corresponds to a volume of between 101% and 200% of the total capacity of the cells 10.

The substance 20 is deposited on the set of cells 10 in a central zone of the component 1. When the quantity of substance 20 is on the set of cells 10, a lower portion of this quantity of substance 20 penetrates into the cells 10 which are covered, and an upper portion of the quantity of substance 20 remains outside of the cells 10, above the latter. This upper portion is then pushed over the set of cells 10, using an appropriate tool, so that the substance penetrates progressively into the newly covered cells 10. The upper portion of the quantity of substance 20 which is situated outside of the cells 10 is pushed using a radial movement over the surface S1. In this way, each zone of the surface S1 is swept a single time. No cell is thus more filled with substance than another one, and no layer of substance is present as excess thickness over the walls, unlike that which would be caused by a movement of spreading the substance which would be carried out in several moves.

An adapted pressure is applied to the tool, in order to push the portion of substance 20 which has not yet penetrated into the cells without leaving a layer of substance over the walls 11 in a zone where the cells 10 are filled. In this way, the tops of the walls 11 remain uncovered, and it will be possible to fix a film for closing the walls on the latter if required. The pressure which is applied to the tool is also adapted so that it does not deform or disintegrate the tops of the walls 11. By way of example, the pressure applied by the tool on the tops of the walls 11 is between atmospheric pressure (min) and 10 bars, and preferably between atmospheric pressure and 5 bars.

When the whole of the surface S1 has thus been moved over, and when all of the cells 10 have been filled with liquid substance, the surplus substance 20 is then expelled radially towards the peripheral edge of the component 1 and is then removed. Preferably, the filling of the cells 10 and the removal of the surplus substance 20 are carried out during a same progression of the tool over the surface S1. If required, the component 1 may be inclined and/or rotated during this movement in order to facilitate the penetration of the substance 20 into the cells 10, or to facilitate the driving of the substance by the tool.

According to a particular procedure illustrated by FIGS. 4a and 4b, the component 1 is placed in a controlled-pressure enclosure 100, with the face S1 facing upwards. It is disposed on a support 101 which can be fitted inside the enclosure 100 and then maintained at a fixed height. The enclosure 100 is hermetically sealed on its upper face by a deformable membrane 30. The membrane 30 is held firmly by a peripheral edge of the latter on a lateral wall of the enclosure 100, for example by screwed clamping ring 102. Before closing the enclosure 100, an appropriate quantity of substance 20 is deposited on the set of cells 10, approximately in the central zone of the surface S1 (FIG. 4a). The support 101 is then raised within the enclosure 100, until the quantity of substance 20 just comes into contact with the membrane 30. The height of the support 101 is then fixed. The pressure inside the enclosure 100 is then progressively reduced, by drawing out the air present inside the enclosure through an orifice 103 provided for this purpose. Under the effect of the reduced pressure, the membrane 30 flexes towards the inside of the enclosure 100, resulting in a progressive radial movement of the quantity of substance 20 which is situated on the cells 10. The substance 20 is pushed parallel with the surface S1 in a circular moving front which becomes progressively larger as the membrane 30 is applied onto the set of cells (FIG. 4b). Each cell 10 is filled when the moving front of the substance 20 passes over that cell. When the partial vacuum is sufficiently increased, the membrane 30 is applied over all of the filled cells and the surplus substance is removed by overflowing the periphery of the component 1.

The substance 20 is pushed over the walls 11 which separate the cells 10 with a pressure adapted so that the substance momentarily present on the tops of the walls 11 is then pushed off. In this way, all of the cells 10 are precisely filled with substance up to the same level, which is fixed by the height of the walls 11, and the tops of the walls 11 are uncovered.

A film for sealing the cells 10 may then be applied over the component 1, on top of the filled cells. Such a film is transparent. It may comprise a surface which is intended to come into contact with the walls 11, on the tops of the latter, and which is constituted by an adhesive material, a hot-melt material or a polymer making it possible to fix the film onto the walls. This surface of the closing film may possibly be activated by heat or by irradiation in order to adhere to the walls 11. Moreover, the film may be heated after having been applied over the set of cells 10, in order to fix the film to the tops of the walls 11 by adhesion, fusion or polymerization. A fluid-tight sealing, or sealing, of the filled cells 10 is thus obtained.

In a particularly advantageous way, the film for sealing the cells is applied over the set of cells at the same time as the cells are filled with substance. In order to do this, the film may be disposed between the component 1 and the tool which is used for pushing the quantity of substance having an optical property over the cells 10. Alternatively, the film may be used directly for pushing the quantity of substance 20 over the cells 10.

In the operational method shown in FIGS. 4a and 4b, the film for sealing the cells 10 may be used as a deformable membrane 30. The sealing film is then applied over the set of cells 10, starting from the central zone of the set of cells, towards the peripheral edge of this set according to a substantially circular application front which follows the moving front of the quantity of substance 20 present over the cells. The film 30 is thus applied onto the tops of the walls 11 without applying any shear stress to the latter. The walls 11 are not therefore deformed. Moreover, the quantity of substance having an optical property 20 is pushed over the cells by the film 30 itself, so that the lower surface of the film 30 is wetted by the substance before this surface obturates each cell 10 opening. In this way, no air bubbles are trapped between the component 1 and the closing film 30. When the reduced pressure in the enclosure 100 is stopped and the ring 102 is removed, the component 1 is withdrawn with the film 30 which is applied over the tops of the walls 11 and which provides the closing of the cells 10.

The component 1 and/or the film 30 may possibly be heated up to a temperature adapted for fixing the film 30 by adhesion, fusion or polymerization to the tops of the walls 11. The sealing of the cells 10 is then definitive. In particular, the film 30 may be fixed to the walls of the cells 11 at the moment of application of the film over the set of cells. In this case the heating may be carried out, for example, by directing an infrared radiation onto the film 30 by means of a source which is placed above the enclosure 100.

It is understood that many modifications or adaptations may be introduced with respect to the methods which have been described in detail above, whilst retaining at least some of the advantages of the invention. For example, the film for sealing the cells may be preformed before being applied onto the optical component, in order to reduce the stresses which may be applied to the partition walls of the cells during the application. Such a pre-forming may be carried out whilst holding the film by one of its edges and by applying a pressure difference on either side of the film.

Finally, the invention is not limited to the production of optical or ophthalmic lenses, the latter may be corrective or non-corrective. It may be applied to the production of optical elements, such as helmet visors, filters, aberration correctors, lighting optics, measuring instrument optics, etc.

The invention claimed is:

1. A method of producing a transparent optical element, which comprises the following steps:
    a) producing an optical component having at least one set of empty cells which are juxtaposed, parallel with a surface of the component, said cells being open at the level of said surface and separated by walls;
    b) depositing a quantity of a liquid substance having an optical property over a part of the set of cells, said quantity corresponding to a volume greater than the total capacity of the cells; and
    c) pushing a portion of the substance which is situated outside of the cells over the walls and the cells, so that the substance penetrates into the cells not yet filled and so as to expel an excess of substance, by sweeping the whole set of cells, the method being characterized in that, in step c), the portion of substance which is situated outside of the cells is pushed radially from a central zone of the set of cells towards a peripheral edge of said set, according to a substantially circular moving front.

2. The method as claimed in claim 1, wherein the quantity of substance which is deposited in step b) corresponds to a volume of between 101% and 200% of the total capacity of the cells.

3. The method as claimed in claim 1, wherein the substance having an optical property is adapted so that an angle of contact between said substance and the optical component is less than 90°.

4. The method as claimed in claim 1, wherein the portion of substance situated outside of the cells is pushed by a deformable membrane applied progressively over the set of cells.

5. The method as claimed in claim 4, wherein the membrane is applied over the set of cells by creating a reduced pressure between the optical component and said membrane.

6. The method as claimed in claim 1, furthermore comprising a sealing of the cells filled with substance by means of a substantially transparent film applied over the set of cells and fixed to the walls of said cells.

7. The method as claimed in claim 6, wherein the film is fixed to the walls of the cells in a permanent manner.

8. The method as claimed in claim 6, wherein a surface of the film coming into contact with the walls of the cells during the application of said film comprises an adhesive material, a hot-melt material or a polymer making it possible to fix said film on said walls.

9. The method as claimed in claim 6, wherein a surface of the film coming into contact with the walls of the cells during the application of said film is activated by heat or by irradiation in order to adhere to said walls.

10. The method as claimed in claim 6, wherein the sealing of the filled cells is carried out by applying the film progressively over the set of cells during step c), said film pushing the portion of substance having an optical property situated outside of the cells during the application.

11. The method as claimed in claim 10, wherein the film is applied over the set of cells starting from a central zone of the set of calls, towards a peripheral edge of said set, according to a substantially circular application front.

12. The method as claimed in claim 11, wherein the film is applied onto the cells by creating a reduced pressure between the optical component and said film.

13. The method as claimed in claim 6, wherein the film is pre-formed before being applied onto the set of cells.

14. The method as claimed in claim 13, wherein the film is pre-formed by holding an edge of said film and by applying a pressure difference on either side of said film.

15. The method as claimed in claim 1, wherein the optical element comprises a lens.

16. The method as claimed in claim 15, wherein the optical element comprises an ophthalmic lens.

17. A transparent optical element produced by using a method as claimed in claim 1.

18. The element as claimed in claim 17, further comprising forming an optical lens.

19. The element as claimed in claim 18, further comprising forming an ophthalmic lens.

* * * * *